(12) United States Patent  (10) Patent No.: US 8,743,429 B2
Soehler  (45) Date of Patent: Jun. 3, 2014

(54) DEVICE FOR REPRODUCING IMAGES THAT CAN BE FOUND ON ORIGINALS

(75) Inventor: Burkhard Soehler, Siegen (DE)

(73) Assignee: Roth + Weber GmbH, Niederdreisbach (DE)

(*) Notice: Subject to any disclaimer, the term of this patent is extended or adjusted under 35 U.S.C. 154(b) by 0 days.

(21) Appl. No.: 13/520,378

(22) PCT Filed: Feb. 8, 2011

(86) PCT No.: PCT/EP2011/000569
§ 371 (c)(1),
(2), (4) Date: Jul. 5, 2012

(87) PCT Pub. No.: WO2011/098246
PCT Pub. Date: Aug. 18, 2011

(65) Prior Publication Data
US 2013/0135690 A1    May 30, 2013

(30) Foreign Application Priority Data

Feb. 11, 2010 (DE) .......................... 10 2010 007 530

(51) Int. Cl.
*H04N 1/04* (2006.01)
(52) U.S. Cl.
USPC ............................. 358/474; 358/494; 358/486
(58) Field of Classification Search
USPC .......... 358/474, 486, 497, 496, 487, 494, 491
See application file for complete search history.

(56) References Cited

U.S. PATENT DOCUMENTS

| 5,005,329 | A  | * | 4/1991  | Schorr .................... 235/462.43 |
| 5,038,227 | A  | * | 8/1991  | Koshiyouji et al. ........... 358/471 |
| 5,724,159 | A  | * | 3/1998  | Nakagawa et al. ........... 358/474 |
| 5,991,054 | A  |   | 11/1999 | Hung |
| 6,108,108 | A  | * | 8/2000  | Peng ............................. 358/497 |
| 6,243,185 | B1 | * | 6/2001  | Lin et al. .................... 359/196.1 |
| 6,377,365 | B1 | * | 4/2002  | Matsumoto .................. 358/488 |
| 6,480,317 | B2 | * | 11/2002 | Wu ............................ 359/196.1 |
| 6,829,065 | B1 | * | 12/2004 | Lee et al. ...................... 358/474 |
| 6,940,623 | B2 | * | 9/2005  | Lee et al. ...................... 358/474 |
| 7,058,351 | B2 | * | 6/2006  | Qian et al. .................... 399/380 |
| 7,310,161 | B2 | * | 12/2007 | Kang et al. .................. 358/1.15 |
| 7,528,996 | B2 |   | 5/2009  | Liu |

(Continued)

FOREIGN PATENT DOCUMENTS

| EP | 0696656 A | 8/2006 |
| JP | 08314027 B | 11/1996 |
| JP | 2009141701 B | 6/2009 |

*Primary Examiner* — Negussie Worku
(74) *Attorney, Agent, or Firm* — Andrew Wilford

(57) ABSTRACT

The invention relates to a device for reproducing images that can be found on originals, comprising at least one image capturing element that lies in a housing (1) and comprising a translucent panel (4) which lies between the image capturing element and the original and which is retained on the housing (1), said original being transportable on the panel for reproduction on the image capturing element. The essentially rectangular panel is retained on the housing at only two of the opposing edges (3, 5) of said panel. The first support for one of the edges (3) consists of at least one spring clip (2, 2', 2", 2'''), and the spring clip preloads the panel against the second support (6) for the opposing edge (5) of the panel. The panel (4) is associated with a handle (7, 7'), by means of which the panel can be manually moved out of the second support against the preload of the spring clip.

7 Claims, 1 Drawing Sheet

(56) References Cited

U.S. PATENT DOCUMENTS

| | | |
|---|---|---|
| 7,567,365 B2 * | 7/2009 | Tsujimoto et al. ............ 358/474 |
| 7,800,790 B2 | 9/2010 | Kageyama |
| 8,441,696 B2 * | 5/2013 | Zahnert et al. ................ 358/473 |
| 8,462,398 B2 * | 6/2013 | Otsuki ........................... 358/474 |
| 8,472,038 B2 * | 6/2013 | Ino ................................ 358/1.13 |

* cited by examiner

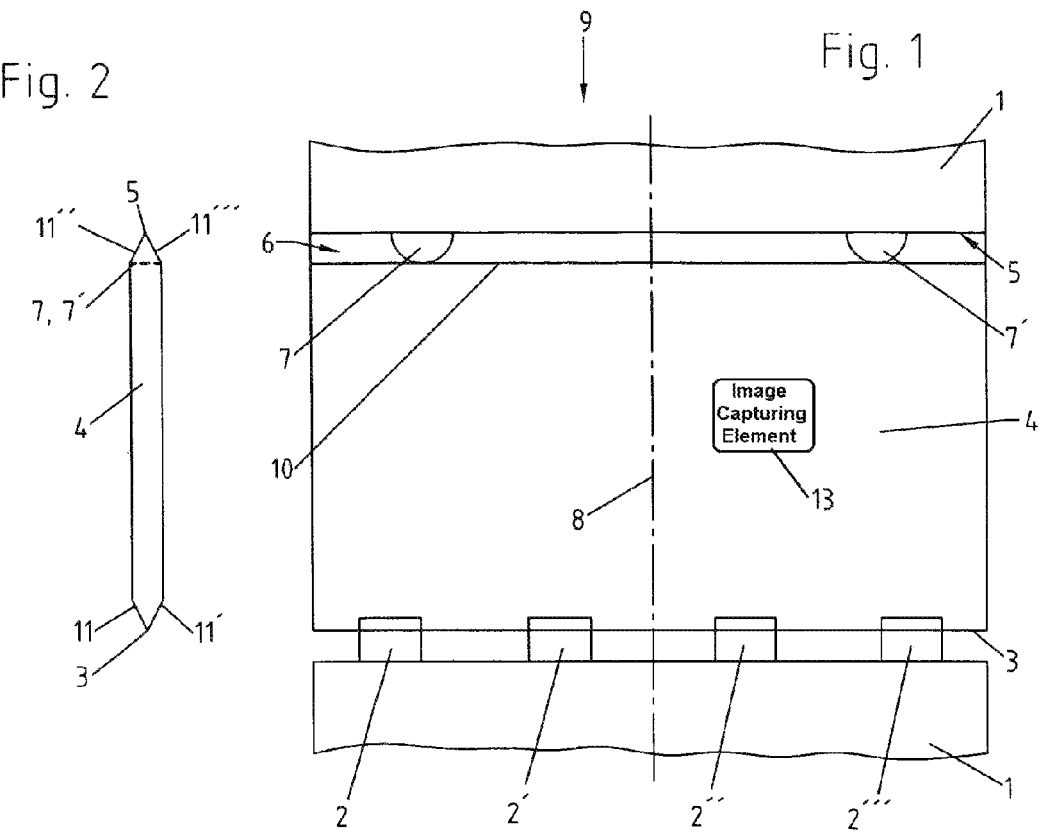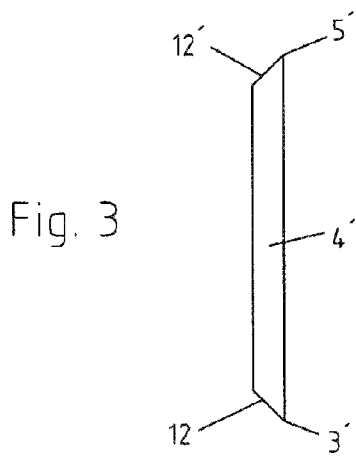

DEVICE FOR REPRODUCING IMAGES THAT CAN BE FOUND ON ORIGINALS

CROSS REFERENCE TO RELATED APPLICATIONS

This application is the US-national stage of PCT application PCT/EP2011/000569 filed 8 Feb. 2011, published 18 Aug. 2011 as WO2011/098246, and claiming the priority of German patent application 102010007530.2 itself filed 11 Feb. 2010.

FIELD OF THE INVENTION

The invention relates to an apparatus for reproducing images of original documents, comprising at least one image-capturing element that is provided in a housing, and a transparent plate, preferably a glass plate, that is provided between the image-capturing element and the original document and that is mounted on the housing, the original document being transported across the transparent plate past the image-capturing element for reproduction.

BACKGROUND OF THE INVENTION

Reproduction apparatuses of this type are known as scanners and copiers. The glass plates are subject to constant wear during scanning and copying since the original documents are transported over the glass plates. Due to the transport action, the glass plates can get scratches or similar damage that regularly create relatively small defects in the reproduction quality for black-and-white reproduction. In the case of color reproductions, however, severe defects regularly result due to the variable refractive behavior within the scratches, with the result that the glass plate has to be replaced.

The glass plates are generally mounted permanently and must be replaced by service personnel or trained users by costly means using tools. To achieve this, holders for the glass plate must be unscrewed, and the glass plate then replaced and screwed back securely in place. Another known approach, however, is to retain the glass plate by latches. In this case, the latches must be opened, the glass plate removed from the locking means, replaced, and then once again latched in place and possibly aligned. Here too, an installer, or at least trained personnel, are required to effect replacement of the glass plate.

OBJECT OF THE INVENTION

The object of the invention is develop the apparatus of this kind so as to enable the glass plate to be replaced without tools, easily, and cost-effectively, which replacement does not have to be performed by trained expert personnel yet still ensures optimal retention during use.

SUMMARY OF THE INVENTION

This object is achieved by an approach where the essentially rectangular glass plate is retained on the housing only by its two opposite edges, the first holder for one of the edges being at least one spring clip that biases the glass plate against the second holder for the opposite edge of the glass plate, and where a grip formation is provided on the glass plate so that, by using this grip formation, the glass plate can be move out of the second holder by hand against the biasing force of the spring clip.

In order to replace the glass plate, it is only necessary to grab the grip formation, slide the glass plate against the spring clips, and move the plate out of the second holder. Once moved out of the second holder, the glass plate can be tilted and removed from the apparatus. Whenever a new plate is to be inserted, the plate is initially set against the retaining clips, moved by the grip formation against the retaining clips, and then brought into alignment with the second holder. Once the grip formation is then released, the spring clips ensure that the glass plate is moved into the second holder and elastically retained. This operation can be easily performed by an untrained person.

An approach has proven successful where recesses are provided as the grip formation for gripping at the edge of the glass plate on the housing and/or the glass plate. When recesses are provided on the housing, the glass plate does not have to be machined to have the recess. The only requirement is that the transported original documents do not become caught in the recess during transport. It is of course obvious, however, that the glass plate edge can also be provided with an appropriate recess. However, it is also possible to provide, for example half the recess on the housing and the other half of the recess on the glass plate edge.

An advantageous approach is to provide two recesses on at least one of the edges of the glass plate. Here the person wanting to undertake replacement of the glass plate can grip in the recess with both hands and move the glass plate. This also enables the glass plate to be mounted securely.

An advantageous approach is one where the two opposite edges of the glass plate have at least one chamfer and the holders for the two edges have complementary grooves with complementary chamfers. What this embodiment achieves is that the glass plate is mounted in the holders in a very specific position relative to the image-capturing element. Alignment of the glass plate is thus unnecessary. Due to the chamfers, the glass plate is also moved back into the precisely required position with each change.

What is worthy of imitation is to have the groove of the second holder extend over essentially the entire width of the glass plate and to have the edge of the groove facing the original copy be above the glass plate in the edge region. This superposition is designed such that the inserted original copy can be passed through the reproducing apparatus without getting caught on any edges of the glass plate. This prevents the original documents from jamming.

The glass plate can also have an identifying code that is readable by a reading apparatus in the housing of the reproducing apparatus, and the reproducing apparatus has a switch that turns the reproducing apparatus on or off depending on detection of the code.

This ensures that even in the event untrained persons change the glass plate the glass plate is not inadvertently forgotten, and an attempt is made to scan or copy without the glass plate, with the result that the image-capturing element could be damaged. The reproducing apparatus is enabled only when the glass plate is properly locked in place. The code can obviously contain additional information, such as, for example a manufacturer's identifier and/or information on the size of the glass plate, with the result that only a glass plate that is compatible with and fits the reproducing apparatus allow the apparatus to function. The code here can provided on the glass plate, for example in the form of the RFID chip.

It is worth noting that the glass plate, the holders, the grip formations, and optionally the identifying code are designed to allow the glass plate to be inserted in any way in the holders.

A first positive aspect for the person performing the replacement is the fact that he/she does not have to worry as to how the glass plate is to be inserted. The glass plate fits in every installation position.

A further aspect is that the glass plate can continue to be used additional times after one side has suffered wear. When, for example an uneven number of cascading image-capturing elements are used, the glass plate can be rotated 180° so that the regions of the glass plate that were initially opposite an image-capturing element are positioned between two image-capturing elements. There is also the possibility when two chamfers each per glass edge are provided to reuse the glass plate by turning it from the front side to the rear side. The scratches created on the original front side are then provided on the rear side. However, since the image-capturing element is focused not on the rear aside but at the plane of the front side, the scratches on the rear side would provide less false information. An additional factor is that when the glass plate is turned a cascading arrangement of image-capturing elements ensures that the scratches originally provided in the region of the image-capturing element are provided after turning in a region in which no image-capturing element is provided.

BRIEF DESCRIPTION OF THE DRAWING

The following discussion describes the invention in more detail based on a drawing. Therein:

FIG. 1 shows an apparatus according to the invention comprising an inserted glass plate;

FIG. 2 is a side view of a glass plate with two chamfers per edge; and

FIG. 3 is a side view of a glass plate with one chamfer per edge.

SPECIFIC DESCRIPTION OF THE INVENTION

FIG. 1 shows a housing 1 partly in section of an apparatus according to the invention for reproducing images on original documents. The housing 1 has spring clips 2, 2', 2", 2''' that hold one edge 3 of a glass plate 4. A second edge 5 of the glass plate 4 is retained in a seat groove 6 of the housing 1. The glass plate 4 has bilateral chamfers 11, 11', 11", 11''' on the edges 3 and 5 as shown FIG. 2, or unilateral chamfers 12 and 12' on the edges 3' and 5' as shown in FIG. 3, which chamfers fit into complementary chamfers in the spring clips 2, 2', 2", 2''' as well as in the retaining groove 6 where they ensure a precisely aligned mounting of the glass plate 4.

The glass plate 4 has recesses 7 and 7' into which, for example one finger each of the person wanting to change the glass plate 4 can be inserted. Once fingers have been inserted into the recesses 7, the glass plate 4 can be pressed against the spring clips 2, 2', 2", 2'''. The edge 5 thereby comes out past an edge 10 of the seat groove 6, and the glass plate 4 can be tilted out of for example the view plane of FIG. 1. Corresponding recesses on the edge 3 are not shown.

After the glass plate 4 has been replaced by a new glass plate 4, or after the glass plate 4 has been turned about an axis 8, or by 180° in the support plane, the edge 3 (or 5) is first placed against the spring clips 2, 2', 2", 2'''. The glass plate 4 is then pressed against the force of the spring clips 2, 2', 2", 2''' against these clips, and then pivoted so that it is aligned with the groove 6. The force against the spring clips 2, 2', 2", 2''' is then reduced so that the spring clips 2, 2', 2", 2''' push the glass plate 4 into the groove 6. The chamfers 11, 12 on the glass plate 4, 4 and the complementary chamfers in the seat groove 6 and the spring clips 2, 2', 2", 2''' ensure that the glass plate 4 is moved precisely into position. If original documents are introduced into the apparatus according to the invention in the direction of arrow 9, the protruding edge of the seat groove 6 ensures that no original document jams can occur.

The invention claimed is:

1. In an apparatus for reproducing images and comprising:
a housing;
at least one image-capturing element in the housing;
first and second spaced holders; and
a transparent plate having first and second opposite edges engaged in the holders and lying between an original document being transported past the plate and carrying an image and the image-capturing element, whereby the element can capture the image on the document as the document passes the plate; and
spring clips in the first holder engaging the first edge of the plate and pressing the second edge into the second holder, the plate being formed with grip formations facilitating gripping of the plate and moving the plate first against the spring clips and out of the second holder and then out of the first holder, the improvement wherein
the two opposite edges of the glass plate each have at least one chamfer, and
the holders are complementary grooves with complementary chamfers for the two edges.

2. In an apparatus for reproducing images and comprising:
a housing;
at least one image-capturing element in the housing;
first and second spaced holders; and
a transparent plate having first and second opposite edges engaged in the holders and lying between an original document being transported past the plate and carrying an image and the image-capturing element, whereby the element can capture the image on the document as the document passes the plate; and
spring clips in the first holder engaging the first edge of the plate and pressing the second edge into the second holder, the plate being formed with grip formations facilitating gripping of the plate and moving the plate first against the spring clips and out of the second holder and then out of the first holder, the improvement wherein
the second holder forms a groove that extends essentially over the entire width of the glass plate, and
a groove edge over which the original document rides is above the glass plate at its edge region.

3. In an apparatus for reproducing images and comprising:
a housing;
at least one image-capturing element in the housing;
first and second spaced holders; and
a transparent plate having first and second opposite edges engaged in the holders and lying between an original document being transported past the plate and carrying an image and the image-capturing element, whereby the element can capture the image on the document as the document passes the plate; and
spring clips in the first holder engaging the first edge of the plate and pressing the second edge into the second holder, the plate being formed with grip formations facilitating gripping of the plate and moving the plate first against the spring clips and out of the second holder and then out of the first holder, the improvement wherein
the glass plate is provided with an identifying code that can be read by a reading apparatus in the housing, and
the reproducing apparatus includes a switch that turns the reproducing apparatus on and off depending on detection of the code.

4. An apparatus for reproducing images, the apparatus comprising:

a housing;

at least one image-capturing element in the housing;

a first holder on the housing;

a second holder groove on the housing open toward the first holder; and a transparent plate having first and second opposite edges engaged in the first holder and holder groove and lying between an original document being transported past the plate and carrying an image and the image-capturing element, whereby the element can capture the image on the document as the document passes the plate; and spring clips in the first holder engaging the first edge of the plate and pressing the second edge into the second holder groove, the plate being formed with grip formations facilitating gripping of the plate and moving the plate first against the spring clips and out of the second holder groove and then out of the first holder.

5. The apparatus according to claim 4, wherein the glass plate, the holders, and the grip formations are designed such that the glass plate can be inserted in any way into the holders.

6. The apparatus according to claim 4, wherein the grip formations are recesses in the second edge for gripping behind the glass plate edge on the housing or behind the glass plate.

7. The apparatus according to claim 6, wherein the recesses are provided on at least one of the edges.

\* \* \* \* \*